(12) United States Patent
Schwarz et al.

(10) Patent No.: US 10,823,060 B2
(45) Date of Patent: Nov. 3, 2020

(54) GAS TURBINE ENGINE WITH SHORT INLET, ACOUSTIC TREATMENT AND ANTI-ICING FEATURES

(71) Applicant: United Technologies Corporation, Farmington, CT (US)

(72) Inventors: Frederick M. Schwarz, Glastonbury, CT (US); Michael Joseph Murphy, Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1016 days.

(21) Appl. No.: 14/974,169

(22) Filed: Dec. 18, 2015

(65) Prior Publication Data

US 2017/0175629 A1    Jun. 22, 2017

(51) Int. Cl.
| | | |
|---|---|---|
| *F02C 7/047* | (2006.01) | |
| *F02C 7/045* | (2006.01) | |
| *B64D 15/02* | (2006.01) | |
| *B64D 15/04* | (2006.01) | |
| *F01D 25/02* | (2006.01) | |
| *F02C 3/04* | (2006.01) | |
| *F02C 7/36* | (2006.01) | |
| *F02K 3/06* | (2006.01) | |
| *F04D 19/00* | (2006.01) | |

(Continued)

(52) U.S. Cl.
CPC .............. *F02C 7/047* (2013.01); *B64D 15/02* (2013.01); *B64D 15/04* (2013.01); *F01D 25/02* (2013.01); *F02C 3/04* (2013.01); *F02C 7/045* (2013.01); *F02C 7/36* (2013.01); *F02K 3/06* (2013.01); *F04D 19/002* (2013.01); *F04D 29/325* (2013.01); *F04D 29/38* (2013.01); *F04D 29/522* (2013.01); *F05D 2220/32* (2013.01); *F05D 2260/20* (2013.01); *F05D 2260/4031* (2013.01)

(58) Field of Classification Search
CPC .. F02C 7/047; F02C 7/045; F02K 3/06; F01D 25/02; B64D 15/02; B64D 15/04; B64D 2033/0233; B64D 2033/0226
See application file for complete search history.

(56) References Cited

U.S. PATENT DOCUMENTS 2,680,345 A    6/1954 Frost
3,890,060 A *  6/1975 Lipstein ................ F04D 29/664
                                             415/119

(Continued)

FOREIGN PATENT DOCUMENTS

WO        2014137685 A1    9/2014

OTHER PUBLICATIONS

Howell, Ian; An Ultra-High Bypass Ratio Turbofan Engine for the Future; Sep. 13, 2014.*

(Continued)

*Primary Examiner* — Todd E Manahan
*Assistant Examiner* — Kyle Robert Thomas
(74) *Attorney, Agent, or Firm* — Carlson, Gaskey & Olds, P.C.

(57) ABSTRACT

A gas turbine engine comprises a fan rotor having fan blades received within an outer nacelle, and the outer nacelle having an inner surface. A distance is defined between an axial outer end of the nacelle, and a leading edge of the fan blade. An anti-icing treatment is provided to an inner periphery of the nacelle over at least 75% of the distance along the inner periphery of the nacelle.

5 Claims, 3 Drawing Sheets

(51) Int. Cl.
*F04D 29/32* (2006.01)
*F04D 29/38* (2006.01)
*F04D 29/52* (2006.01)

(56) References Cited

U.S. PATENT DOCUMENTS

| | | | | |
|---|---|---|---|---|
| 5,058,617 | A * | 10/1991 | Stockman | B64D 33/02 |
| | | | | 137/15.1 |
| 5,841,079 | A | 11/1998 | Parente | |
| 8,540,185 | B2 * | 9/2013 | Vauchel | B64D 33/02 |
| | | | | 244/53 B |
| 9,061,769 | B2 * | 6/2015 | Boulet | B64D 33/02 |
| 9,388,767 | B2 * | 7/2016 | Porte | B64D 15/04 |
| 2002/0047070 | A1 | 4/2002 | Breer et al. | |
| 2002/0179773 | A1 | 12/2002 | Breer et al. | |
| 2004/0259679 | A1 * | 12/2004 | Becquerelle | F16H 1/2827 |
| | | | | 475/331 |
| 2008/0053100 | A1 * | 3/2008 | Venkataramani | F02C 7/14 |
| | | | | 60/772 |
| 2010/0281880 | A1 * | 11/2010 | Porte | B64D 33/02 |
| | | | | 60/785 |
| 2011/0133035 | A1 | 6/2011 | Vauchel | |
| 2011/0167781 | A1 | 7/2011 | Maheshwari | |
| 2014/0020404 | A1 * | 1/2014 | Sheridan | F02C 7/06 |
| | | | | 60/805 |
| 2014/0205446 | A1 | 7/2014 | Patsouris | |
| 2014/0245749 | A1 | 9/2014 | Mercier et al. | |
| 2015/0044028 | A1 | 2/2015 | Lord et al. | |

OTHER PUBLICATIONS

Bill Gunston, Jane's Aero-Engines, Issue 7, "Pratt & Whitney PW8000" (Year: 2000).*
Soares, Claire, "Gas Turbines A Handbook of Air, Land andSea Applications", 2008, Butterworth-Heinemann, an imprint of Elsevier Inc., (Year: 2008).*
Hepher,T., "The 'great engine game' behind new Boeing jet project", Reuters, Feb. 19, 2016. (Year: 2016).*
Gavaghan, Helen, "The high flying sell-off", May 7, 1987, New Scientist, No. 1559, p. 52-54 (Year: 1987).*
European Search Report for European Application No. 16204807.8 dated May 3, 2017.

* cited by examiner

GAS TURBINE ENGINE WITH SHORT INLET, ACOUSTIC TREATMENT AND ANTI-ICING FEATURES

BACKGROUND OF THE INVENTION

This application relates to a gas turbine engine having an anti-icing feature.

Gas turbine engines are known and typically include a fan delivering air into a bypass duct as propulsion air and into a compressor as core flow. The air is compressed in the compressor and delivered into a combustor where it is mixed with fuel and ignited. Products of this combustion pass downstream over turbine rotors, driving them to rotate.

Recently, a gear reduction has been incorporated between a fan drive turbine and the fan rotor. This has increased the design freedom for the gas turbine engine designer. In particular, the fan can now be made to rotate slower than the turbine. With this change, the diameter of the fan has increased.

It has recently been proposed to provide a gas turbine engine, where the inlet or area of a surrounding housing or nacelle forward of the fan rotor, is shorter than in the past. Providing a shorter inlet reduces the weight of the engine and also reduces external drag. Other benefits include reducing a bending moment and corresponding load on an engine structure during flight conditions such as takeoff. Further, by making the inlet shorter, the overall envelope of the engine is reduced.

However, the shorter inlets raise various challenges including an increased exposure to icing.

SUMMARY OF THE INVENTION

In a featured embodiment, a gas turbine engine comprises a fan rotor having fan blades received within an outer nacelle, and the outer nacelle having an inner surface. A distance is defined between an axial outer end of the nacelle, and a leading edge of the fan blade. An anti-icing treatment is provided to an inner periphery of the nacelle over at least 75% of the distance along the inner periphery of the nacelle.

In another embodiment according to the previous embodiment, a distance is defined from a plane defined by leading edges of the fan blades to an axial location of a forwardmost part of the nacelle. An outer diameter of the fan blades is defined, and a ratio of the distance to the outer diameter is between about 0.2 and about 0.5.

In another embodiment according to any of the previous embodiments, the outer end of the nacelle extends outwardly for varying extents across a circumference of the nacelle, and the ratio of the distance to the outer diameter for all locations of the nacelle is between about 0.2 and about 0.45.

In another embodiment according to any of the previous embodiments, a fan drive turbine drives the fan rotor through a gear reduction.

In another embodiment according to any of the previous embodiments, a gear ratio of the gear reduction is greater than about 2.3.

In another embodiment according to any of the previous embodiments, the fan rotor delivers air into a bypass duct as bypass air, and into a core engine including a compressor. A bypass ratio is defined as the volume of air being delivered into the bypass duct to the volume of air delivered into the core engine, with the bypass ratio being greater than about 6.

In another embodiment according to any of the previous embodiments, a tube is positioned within a bulkhead at the outer end of the nacelle. The tube delivers heated air against the outer end of the nacelle. The air then moves rearwardly to transpiration holes placed adjacent a wall defining an inner end of the bulkhead, with the air being allowed to leave the transpiration holes and move along the inner periphery of the nacelle as the anti-icing treatment.

In another embodiment according to any of the previous embodiments, the anti-icing treatment includes providing a heated circuit along the inner periphery of the nacelle.

In another embodiment according to any of the previous embodiments, the heated circuit includes a foil being provided with a current to generate heat.

In another embodiment according to any of the previous embodiments, the nacelle includes a bulkhead at the outer end and an inner chamber positioned inwardly from the bulkhead, and wherein a tube in the inner chamber delivers air against an inner face of the nacelle as the anti-icing treatment.

In another embodiment according to any of the previous embodiments, the nacelle is provided with an acoustic treatment over the majority of its circumference at an inner periphery, but there being no acoustic treatment across approximately 20° at a location centered substantially about bottom dead center when the gas turbine engine is mounted on an aircraft, and an anti-icing feature being mounted where the acoustic treatment is not provided.

In another embodiment according to any of the previous embodiments, the anti-icing feature is provided over at least 90% of the location.

In another embodiment according to any of the previous embodiments, a tube is positioned within a bulkhead at the outer end of the nacelle. The tube delivers heated air against the outer end of the nacelle. The air then moves rearwardly to transpiration holes placed adjacent a wall defining an inner end of the bulkhead, with the air being allowed to leave the transpiration holes and move along the inner periphery of the nacelle as the anti-icing treatment.

In another embodiment according to any of the previous embodiments, the anti-icing treatment includes providing a heated circuit along the inner periphery of the nacelle.

In another embodiment according to any of the previous embodiments, the heated circuit includes a foil being provided with a current to generate heat.

In another embodiment according to any of the previous embodiments, the nacelle includes a bulkhead at the outer end and an inner chamber positioned inwardly from the bulkhead, and wherein a tube in the inner chamber delivers air against an inner face of the nacelle as the anti-icing feature.

In another embodiment according to any of the previous embodiments, the nacelle is provided with an acoustic treatment over the majority of its circumference at an inner periphery, but there being no acoustic treatment across at least 20° at a location centered substantially about bottom dead center when the gas turbine engine is mounted on an aircraft, and an anti-icing feature being mounted where the acoustic treatment is not provided.

In another embodiment according to any of the previous embodiments, the anti-icing feature is provided over at least 90% of the location.

In another embodiment according to any of the previous embodiments, a tube is positioned within a bulkhead at the outer end of the nacelle. The tube delivers heated air against the outer end of the nacelle. The air then moves rearwardly to transpiration holes placed adjacent a wall defining an inner end of the bulkhead, with the air being allowed to leave the transpiration holes and move along the inner periphery of the nacelle as the anti-icing treatment.

In another embodiment according to any of the previous embodiments, the anti-icing treatment includes providing a heated circuit along the inner periphery of the nacelle.

In another embodiment according to any of the previous embodiments, the heated circuit includes a foil being provided with a current to generate heat.

In another embodiment according to any of the previous embodiments, the nacelle includes a bulkhead at the outer end and an inner chamber positioned inwardly from the bulkhead, and wherein a tube in the inner chamber delivers air against an inner face of the nacelle as the anti-icing treatment.

In another embodiment according to any of the previous embodiments, the nacelle is provided with an acoustic treatment over the majority of its circumference at an inner periphery, but there being no acoustic treatment across at least 20° at a location centered substantially about bottom dead center when the gas turbine engine is mounted on an aircraft, and an anti-icing feature being mounted where the acoustic treatment is not provided.

In another embodiment according to any of the previous embodiments, the anti-icing feature is provided over at least 90% of the location.

These and other features may be best understood from the following drawings and specification.

DETAILED DESCRIPTION

Figure 1:
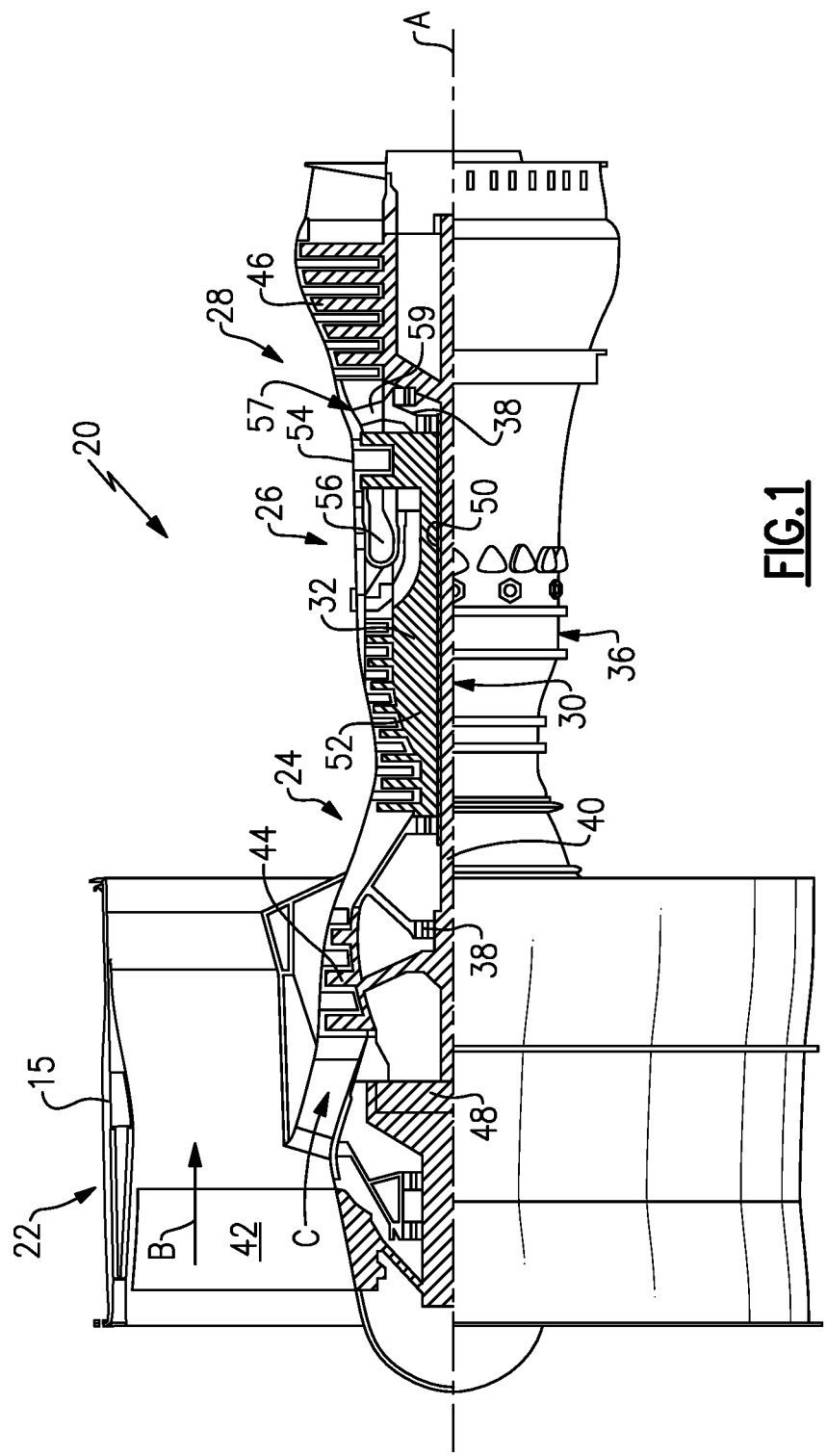
FIG. 1 schematically shows an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
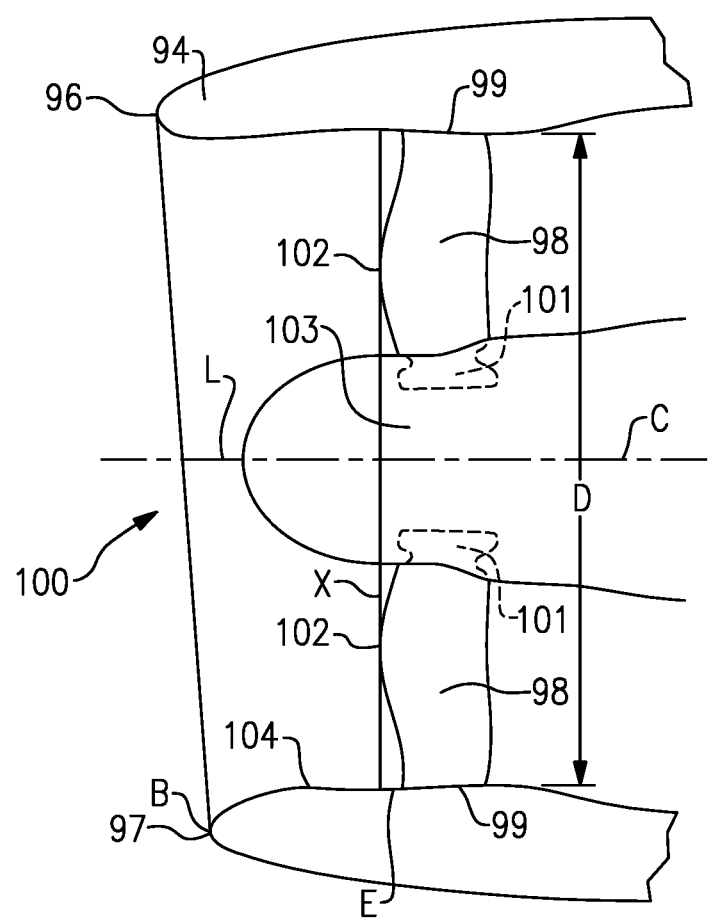
FIG. 2 shows a challenge in short inlet engines.

FIG. 2 shows an engine known as a short inlet engine. As shown, a nacelle 94 has forwardmost ends 96 and 97. As can be seen, the forwardmost ends do not necessarily lie in a common plane perpendicular to a center axis of the engine. Rather, point 96 is further forward than point 97. Fan blades 98 have an outer diameter 99. The nacelle 94 is shown to have a radially inwardly extending innermost point 104. Point 104 is inward of the outer diameter 99 of the fan blade 98. As shown schematically, the fan blades 98 have a root section 101 received in a hub 103 of the fan rotor.

The short inlet may be defined by a distance L measured from: (a) a plane X perpendicular to a central axis C, which plane also being tangent to a leading edge or forward most point 102 of the fan blade 98 to (b) a plane defined by the forwardmost points (including ends 96, 97) of the nacelle 94. A ratio is defined of L:D with D being the outer diameter of the fan blade 98.

In one embodiment L:D is between about 0.2 and about 0.45. Alternatively, the ratio may be greater than about 0.25 and in alternative embodiments greater than about 0.30. In embodiments, the ratio of L:D may be less than about 0.40.

As can be appreciated, the L:D quantity would be different if measured to the forward point 96 than to the forward point 97. However, in embodiments the ratio at the forward most point 96 would still be less than about 0.45, and the ratio at the shortest point 97 would still be greater than about 0.2.

Stated another way, the forwardmost end of said nacelle extends outwardly for varying extents across the circumference of the nacelle, and the ratio of the L:D for all portions of the varying distance of the nacelle being between about 0.2 and about 0.45.

An engine such as shown in FIG. 2 wherein there is a point 96 further forward than a point 97 is said to have droop. In an engine having a short inlet, and in particular one with droop, there are challenges with regard to the build-up of ice on the inner surface of the nacelle. Further, the point or throat 104 could serve as a dam for build-up of ice and water.

When the engine moves from a high altitude cruise condition, where ice is more likely to build up, to a higher power condition, the ice may peel away, and can raise challenges. Thus, anti-icing is desirable from a beginning point B to an end point E along the inner surface of the nacelle, up to the beginning of the fan blade.

Figure 3:
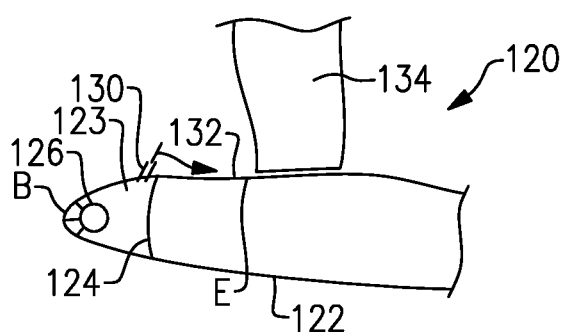
FIG. 3 shows a first embodiment.

FIG. 3 shows a first engine embodiment 120 having a nacelle 122 with a bulkhead 123 at a forward end, and extending inwardly to a wall 124. A tube 126 is shown to be delivering heated air against the forward end B. This is as known in the art. However, the prior art has typically routed this air outwardly through louvres, at an upstream position. In the engine 120, the air is passed through a plurality of transpiration holes 130 such that it will adhere to an inner surface 132 of the nacelle 122, and approach the location of the blade 134. The holes 130 are either just upstream or just downstream of wall 124. In an embodiment, the distance between the holes and the wall is less than 5% of the distance between B and E. This air will be relatively cool compared to the air leaving the tube 126, as it has already been impinged off of the wall adjacent the point B. However, it will still be sufficiently warm as to prevent ice which may otherwise build up along the surface 132.

Figure 4:
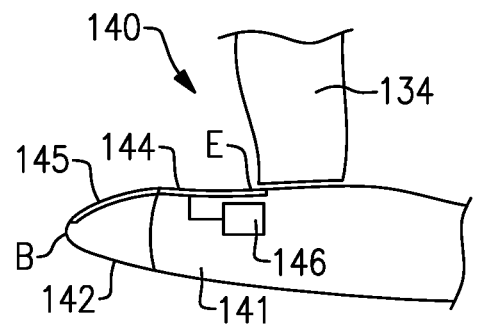
FIG. 4 shows another embodiment.

FIG. 4 shows an alternative engine embodiment 140. Here the bulkhead 142 is positioned forwardly of a chamber 141. An electric circuit element 144, which may be effectively a foil heating member, communicates with a control 146 which supplies current to provide heat to the inner periphery of the nacelle 145. Again, the heat is provided between the beginning point B and the end point E.

Figure 5:
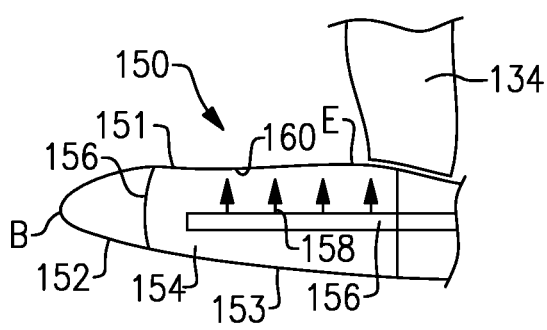
FIG. 5 shows yet another embodiment.

FIG. 5 shows an alternative engine embodiment 150. Here the bulkhead 152 is positioned forwardly of the chamber 154. A wall 156 defines an end of the bulkhead 152. The inner surface 151 of the chamber 154 has an inner wall 160. A tube 156 directs air through openings 158 against the inner wall 160 to prevent ice. Again, this provides anti-icing rearwardly of the wall 156 defining the bulkhead 152, and to the end point E.

Figure 6:
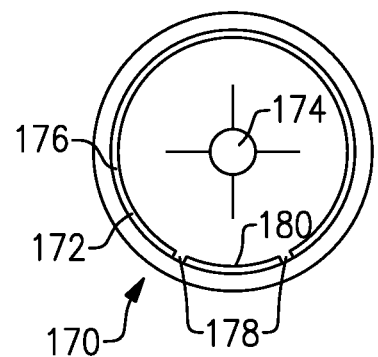
FIG. 6 shows yet another embodiment.

FIG. 6 shows an engine embodiment 170 wherein the nacelle 172 is provided about a fan rotor 174. An acoustic treatment 176, as known, surrounds the majority of the circumference of the fan rotor 174. As known, the acoustic treatment may include layers such as honeycomb layers and perforated layers which will reduce the sound impact of the gas turbine engine. However, there are circumferential ends 178 of the acoustic treatment 176. These end points are at least 10° on either side, centered substantially (+/−10°) of bottom dead center. That is, at least 20° centered substantially (+/−10°) about bottom dead center. This location is of less importance in being provided with acoustic treatment, as the upper surfaces are more likely to deflect sound back at the earth. In this location, anti-icing elements 180 are provided which may be of the sort shown in any of the FIGS. 3-5. The substantially bottom dead center location is that which is most prone to ice challenges. Thus, by eliminating the acoustic treatment at that location, and otherwise providing the anti-icing treatment, the potential impact of the ice is reduced.

While the embodiments show the anti-icing treatment occurring from the forward most end B to a point E aligned with the leading edge of the fan blade, in embodiments, the anti-icing only need occur over 75% of this distance. In other embodiments, the anti-icing may occur over only 90% of this distance. In embodiments, the anti-icing occurs over 100% of this distance.

Also, while the anti-icing treatment may occur over 360° about the center line of the engine, FIG. 6 makes clear it only need occur over a limited portion of the circumference to come under this disclosure. It is clear from FIG. 6 that the anti-icing treatment is at a location between circumferential ends of the acoustic treatment. That is, FIG. 6 is a cross-section such that acoustic treatment 176 and the no acoustic treatment area 180 are at a common axial position.

These embodiments are particularly beneficial in engines having a short inlet, droop and a gear driving the fan.

Although various embodiments of this invention have been disclosed, a worker of ordinary skill in this art would recognize that certain modifications would come within the scope of this invention. For that reason, the following claims should be studied to determine the true scope and content of this invention.

The invention claimed is:
1. A gas turbine engine comprising:
a fan rotor having fan blades received within an outer nacelle, and said outer nacelle having an inner surface; and
a first distance being defined between an axial outer end of said nacelle, and a leading edge of said fan blade, and there being an anti-icing treatment provided to an inner periphery of said nacelle over at least 75% of the first distance along said inner periphery of said nacelle;

wherein a second distance is defined from a plane defined by leading edges of said fan blades to an axial location of a forward most part of said nacelle, and an outer diameter of said fan blades being defined, and a ratio of said second distance to said outer diameter is between 0.2 and 0.5;

wherein said outer end of said nacelle extends outwardly for varying extents across a circumference of said nacelle, and said ratio of said second distance to the outer diameter for all locations of said nacelle being between 0.2 and 0.45;

wherein a fan drive turbine driving said fan rotor through a gear reduction;

wherein said nacelle is provided with an acoustic treatment over the majority of its circumference at an inner periphery, but there being no acoustic treatment across at least 20° at a no acoustic treatment location centered substantially bottom dead center when the gas turbine engine is mounted on an aircraft, and an anti-icing feature being mounted where the acoustic treatment is not provided;

said no acoustic treatment location being at a common axial cross-section as said acoustic treatment, such that said acoustic treatment has circumferential ends and said anti-icing feature extends over only a limited portion of said circumference and is circumferentially intermediate those circumferential ends; and wherein said anti-icing feature below provided over at least 90% of said no acoustic treatment location.

2. The gas turbine engine as set forth in claim 1, wherein a tube is positioned within a bulkhead at the outer end of said nacelle, said tube delivering heated air against said outer end of said nacelle, and the air then moving rearwardly to transpiration holes placed adjacent a wall defining an inner end of said bulkhead, with said air being allowed to leave said transpiration holes and move along the inner periphery of said nacelle as the anti-icing treatment.

3. The gas turbine engine as set forth in claim 1, wherein said anti-icing treatment includes providing a heated circuit along the inner periphery of said nacelle.

4. The gas turbine engine as set forth in claim 3, wherein said heated circuit includes a foil being provided with a current to generate heat.

5. The gas turbine engine as set forth in claim 1, wherein said nacelle includes a bulkhead at the outer end and an inner chamber positioned inwardly from said bulkhead, and wherein a tube in said inner chamber delivers air against an inner face of said nacelle as the anti-icing treatment.

* * * * *